United States Patent
Martin

(10) Patent No.: US 6,173,961 B1
(45) Date of Patent: Jan. 16, 2001

(54) SEAL ASSEMBLY

(75) Inventor: Jon W. Martin, Loudon, TN (US)

(73) Assignee: TRW Inc., Lyndhurst, OH (US)

( * ) Notice: Under 35 U.S.C. 154(b), the term of this patent shall be extended for 0 days.

(21) Appl. No.: 09/286,953

(22) Filed: Apr. 6, 1999

(51) Int. Cl.$^7$ ........................................... F16J 15/32
(52) U.S. Cl. ..................... 277/353; 277/402; 277/549; 277/560
(58) Field of Search ...................... 277/353, 551, 277/572, 560, 402, 408, 549, 401; 180/428

(56) References Cited

U.S. PATENT DOCUMENTS

| 3,044,786 | * | 7/1962 | Chillson . |
| 3,685,838 | | 8/1972 | Malmstrom . |
| 4,195,854 | * | 4/1980 | Bertin . |
| 4,351,228 | * | 9/1982 | Schultz et al. . |
| 4,410,190 | | 10/1983 | Potter . |
| 5,181,581 | | 1/1993 | Engler . |
| 5,709,283 | | 1/1998 | Nief . |

* cited by examiner

Primary Examiner—Terry Lee Melius
Assistant Examiner—William L. Miller
(74) Attorney, Agent, or Firm—Tarolli, Sundheim, Covell, Tummino & Szabo L.L.P.

(57) ABSTRACT

An improved seal assembly (142) is used in a power steering system (10) having an axially reciprocatable shaft (36). The seal assembly (142) has an inner side (164) which is exposed to hydraulic fluid. The seal assembly (142) includes a flexible lip (148) having a circular line (152) of minimum diameter. An annular coil spring (158) is disposed in engagement with a side of the flexible lip opposite from the line (152) of minimum diameter. The coil spring (158) has a circular central axis (170) which is axially offset from a plane containing the line (152) of minimum diameter of the flexible lip (148). The circular central axis (170) of the coil spring (158) is offset from the line (152) of minimum diameter of the flexible lip (148) in a direction toward the inner side (164) of the seal assembly (142) prior to installation of the seal assembly in the power steering system (10).

4 Claims, 3 Drawing Sheets

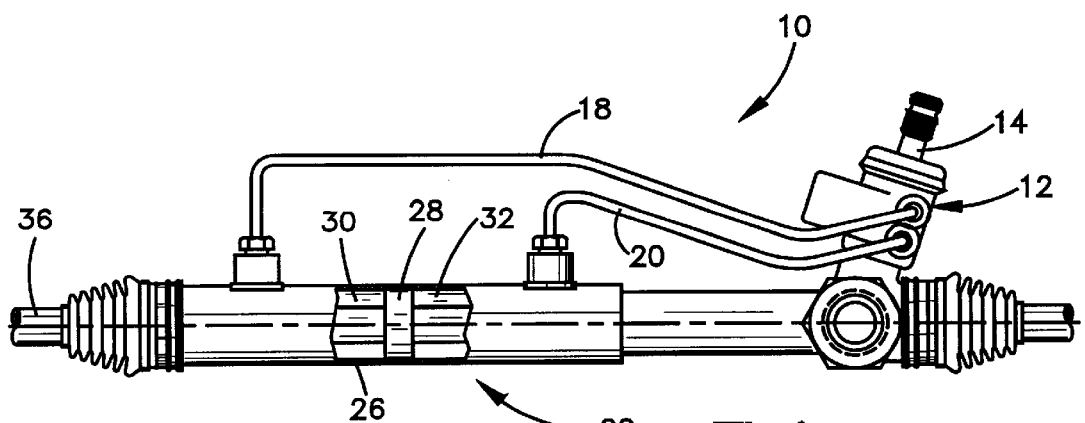
Fig.1 PRIOR ART
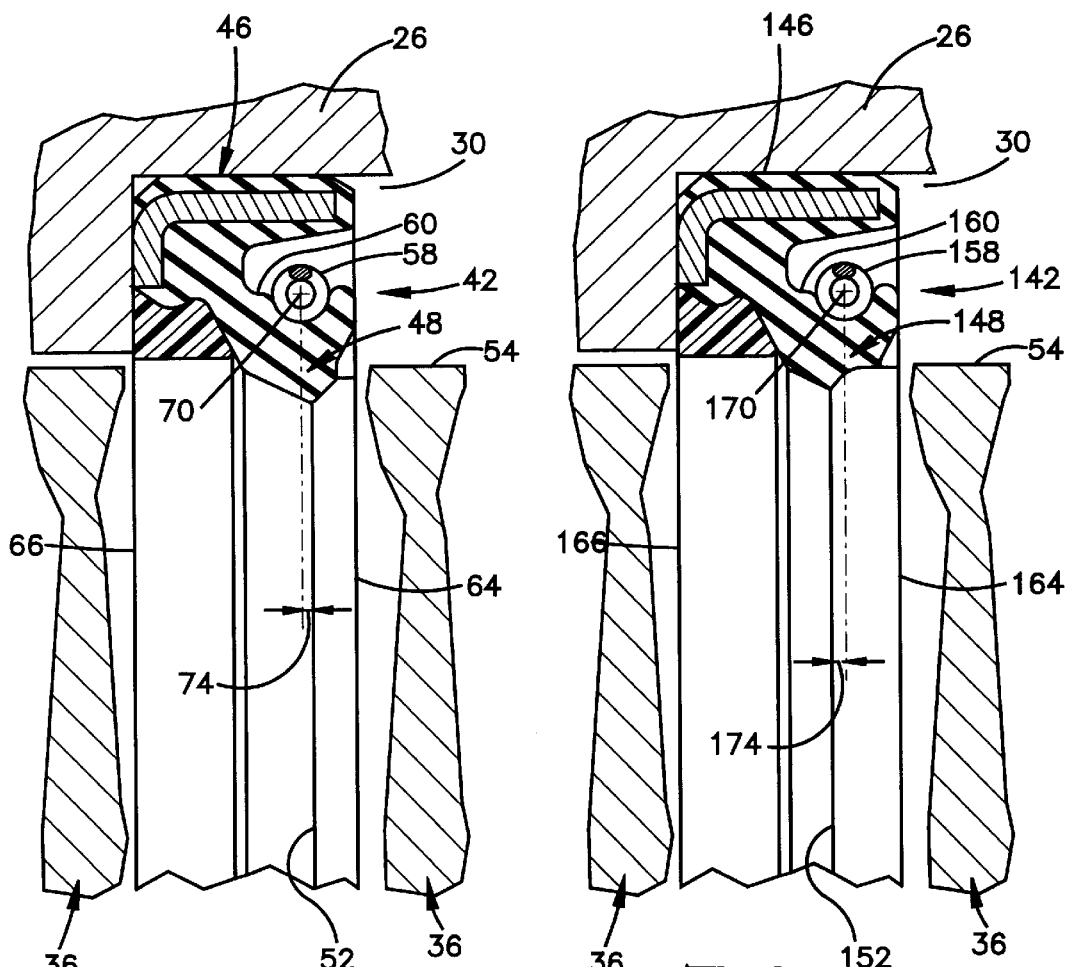
Fig.2 PRIOR ART
Fig.3

SEAL ASSEMBLY

BACKGROUND OF THE INVENTION

The present invention relates to an improved seal assembly which is used in a power steering system having a motor with an axially reciprocatable shaft.

A known power steering system has a hydraulic motor which is connected with steerable vehicle wheels. The hydraulic motor is operable to turn the steerable vehicle wheels. The hydraulic motor of the known power steering system includes a piston and a shaft which is connected with the piston and the steerable vehicle wheels. When the motor is operated to turn the steerable vehicle wheels, the shaft is reciprocated relative to a motor housing.

The known power steering motor includes a seal assembly which is disposed between the motor housing and the reciprocatable shaft. The seal assembly is connected with the housing. The seal assembly has a flexible lip which engages a cylindrical outer side surface of the reciprocatable shaft. After the power steering motor has been used for an extended period of time, the seal assembly may wear and develop a leak. It is desirable to maximize the operating life of a seal assembly before it begins to leak.

SUMMARY OF THE INVENTION

The present invention relates to a new and improved seal assembly for use in a power steering system having a motor with an axially reciprocatable shaft. The seal assembly has an inner side which is exposed to hydraulic fluid pressure during operation of the motor. The seal assembly has a flexible lip with a circular line of minimum diameter. An annular coil spring is disposed in engagement with a side of a flexible lip opposite from the line of minimum diameter.

The coil spring has a central axis which extends around a portion of the flexible lip. The central axis of the coil spring is offset from a plane containing the line of minimum diameter of the flexible lip in the direction toward the inner side of the seal assembly prior to installation of the seal assembly in the power steering system. It has been found that this construction increases the operating life of the seal assembly. The circular central axis of the coil spring may be advantageously offset from the plane containing the line of minimum diameter of the flexible lip in a direction toward the inner side of the seal assembly by a distance of between 0.15 and 0.75 millimeters prior to installation of the seal assembly in the power steering system.

BRIEF DESCRIPTION OF THE DRAWINGS

The foregoing and other features of the invention will become more apparent to one skilled in the art to which the present invention relates upon consideration of the following description of the invention with reference to the accompanying drawings wherein:

FIG. 1 is a simplified schematic illustration of a known power steering system for use in turning steerable vehicle wheels;

FIG. 2 is a simplified fragmentary schematic illustration of a known seal assembly which has been used in known power steering systems;

FIG. 3 is a simplified fragmentary schematic view of an improved seal assembly constructed in accordance with the present invention for use in a power steering system;

DESCRIPTION OF ONE SPECIFIC PREFERRED EMBODIMENT OF THE INVENTION

Power Steering System

Figure 4:
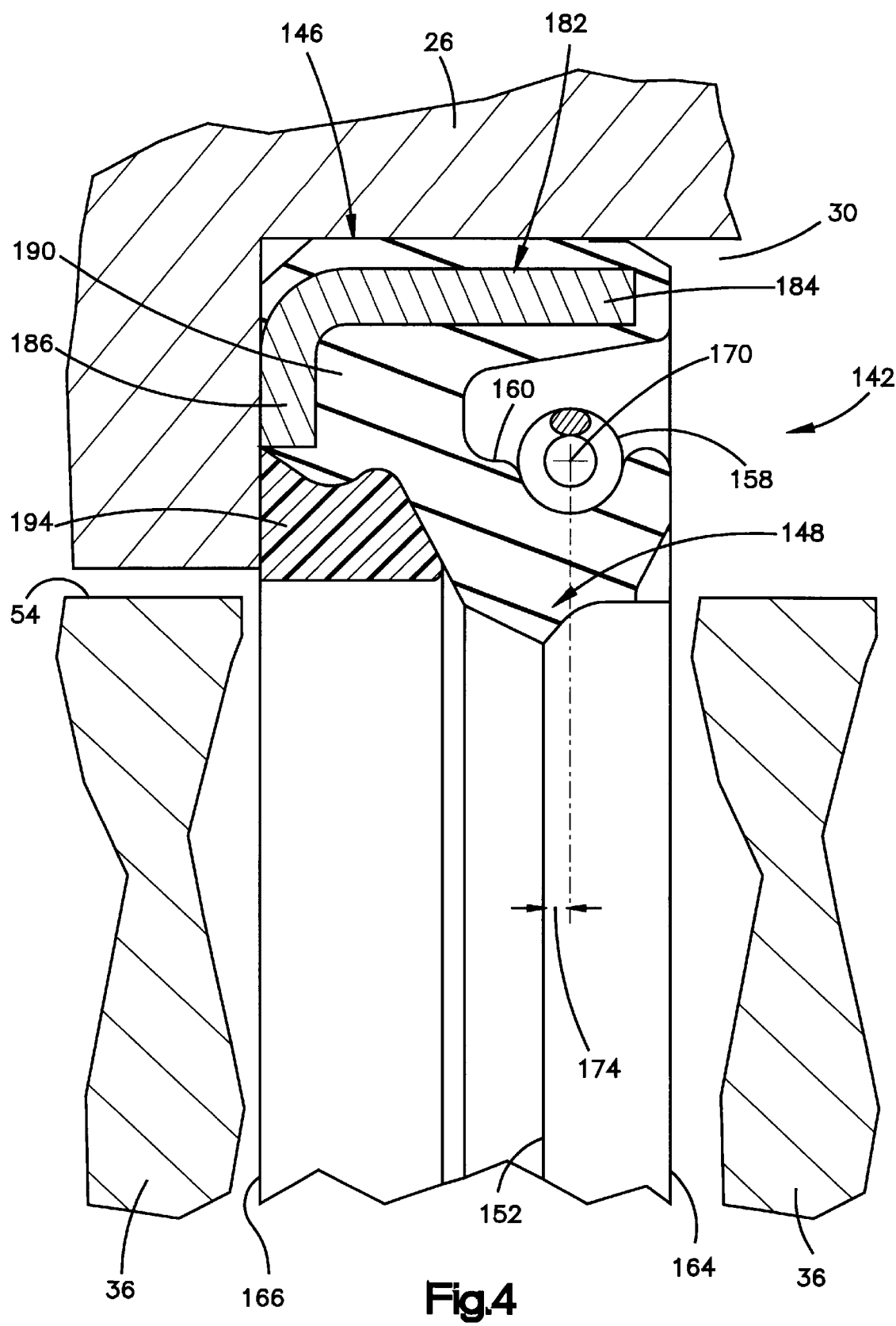
FIG. 4 is an enlarged fragmentary view of a portion of FIG. 3 and further illustrating the construction of the improved seal assembly.

A power steering system 10 (FIG. 1) is operable to turn steerable vehicle wheels. The power steering system 10 includes a control valve assembly 12 having an input shaft 14 connected with a vehicle steering wheel. Operation of the control valve assembly 12 enables hydraulic fluid to flow through conduits 18 and 20 connected with a power steering motor 22.

The power steering motor 22 includes a generally cylindrical housing 26 which is fixedly connected with a frame of a vehicle. The housing 26 encloses a cylindrical piston 28. The piston 28 cooperates with the housing 26 to form a pair of variable volume chambers 30 and 32. Upon operation of the control valve assembly 12, hydraulic fluid under pressure is conducted to one of the variable volume chambers 30 or 32 and is exhausted from the other variable volume chamber.

The piston 28 is fixedly connected with a cylindrical reciprocatable shaft 36. Opposite ends of the reciprocatable shaft 36 are connected with steerable vehicle wheels. Upon operation of the control valve assembly 12, hydraulic fluid pressure in one of the variable volume chambers 30 or 32 causes the piston 28 to move axially relative to the housing 26. This results in axial movement of the shaft 36 to turn the steerable vehicle wheels in a known manner.

Known Seal Assembly

Prior to the present invention, a known seal assembly 42 (FIG. 2) was provided between the housing 26 and reciprocatable shaft 36. The known seal assembly 42 may be referred to as a standard seal assembly for a power steering motor 22. The known seal assembly 42 includes a base 46 which is fixedly connected with the housing 26 of the power steering motor 22. A flexible lip 48 extends from the base 46 and engages the reciprocatable shaft 36.

The flexible lip 48 is illustrated in FIG. 2 in an initial or unrestrained condition which the lip has prior to installation of the seal assembly 42 in the power steering system 10. Thus, as illustrated in FIG. 2, the flexible lip 48 is not deflected by engagement with the reciprocatable shaft 36 of the power steering motor 22.

The flexible lip 48 has a circular line 52 of minimum diameter. The circular line 52 of minimum diameter has a diameter which is less than the outside diameter of the shaft 36. Therefore, when the flexible lip 48 engages a cylindrical outer side surface 54 on the shaft 36, the flexible lip 48 is deflected radially outward. An annular helical coil or garter spring 58 (FIG. 2) engages a radially outer side 60 of the lip 58. Thus, the spring 58 engages the side of the lip 48 opposite from the line 52 of minimum diameter.

The known seal assembly 42 of FIG. 2 has an axially inner side 64 which is exposed to hydraulic fluid pressure in the variable volume chamber 30 during operation of the power steering motor 22. The radially outer side 60 of the flexible lip 48 is also exposed to the hydraulic fluid pressure in the variable volume chamber 30. The known seal assembly 42 also has an axially outer side 66 which is exposed to ambient (air) pressure during operation of the power steering motor 22.

A circular central axis 70 of the annular spring 58 is disposed in a radial plane which extends perpendicular to the longitudinal central axes of the shaft 36 and known seal assembly 42. In the known seal assembly 42 (FIG. 2), the plane containing the circular central axis of the spring 58 is offset toward the air or outer side 66 of the seal assembly from a radial plane containing the circular line 52 of minimum diameter of the flexible lip 48. The plane containing the central axis 70 of the spring 58 extends parallel to the plane containing the line 52 of minimum diameter of the flexible lip 48. However, the plane containing the line 52 of minimum diameter of the flexible lip 48 is offset from the plane containing the central axis 70 of the spring 58 in a direction toward the inner side 64 of the known seal assembly 42.

The distance by which the plane containing the central axis 70 of the helical coil spring 58 is offset from the plane containing the line 52 of minimum diameter of the flexible lip 48 may be referred to as the R-value of the known seal assembly 42. Although other conventions may be used, when the central axis 70 of the spring 58 is disposed in a radial plane which is offset toward the air or outer side 66, that is, toward the left as viewed in FIG. 2, from the radial plane containing the line 52 of minimum diameter of the flexible lip 48, the R-value may be referred to as being negative. It is believed that known power steering systems with reciprocatable shafts 36 have all been constructed with seal assemblies 42 having a negative R-value. Thus, the central axes of the springs 58 of the known seal assemblies are offset toward the outer or air side 66 of the seal assembly from a radial plane containing the circular line 52 of minimum diameter of the flexible lip 48 prior to installation of the seal assembly in the power steering system 10.

One known seal assembly 42 used in power steering systems having reciprocatable shafts 36 had a coil spring 58 with a circular central axis 70 disposed in a plane which is offset from the line of minimum diameter 52 of the flexible lip 48 by a distance indicated at 74 in FIG. 2. The distance 74 for the one known seal assembly 42 was 0.25 millimeters. This resulted in the known seal assembly 42 having a negative R-value of 0.25 millimeters or approximately 0.01 inches.

It should be understood that known seal assemblies, corresponding to the seal assembly 42 have been constructed with R-values different than the specific aforementioned R-value of 0.25 millimeters. It is believed that known seal assemblies 42 for use in power steering motors 22 having reciprocatable shafts 36 may have been constructed with a negative R-value of at least as much as 0.75 millimeters (approximately 0.03 inches). It is believed that known seal assemblies 42 for use in power steering motors 22 having reciprocatable shafts 36 have been constructed with negative R-values within a substantial range of distances. However, these known seal assemblies all had a negative R-value, that is, the plane containing the central axis 70 of the spring 58 was offset in a direction toward the outer or air side 66 of the seal assembly prior to installation of the seal assembly in a power steering motor.

Improved Seal Assembly

An improved seal assembly 142 constructed in accordance with the present invention is illustrated in FIG. 3. The improved seal assembly 142 has an annular base 146 which is fixedly connected with the motor housing 26. An annular flexible lip 148 extends radially inward from the base 146. The annular flexible lip 148 has a circular line 152 of minimum diameter.

The improved seal assembly 142 has been shown in an initial or relaxed condition in FIG. 3, prior to installation in the power steering system 10. When the seal assembly 142 is installed in the power steering system 10, the flexible lip 148 is engageable with the cylindrical outer side surface 54 on the reciprocatable shaft 36. When the flexible lip 148 engages the reciprocatable shaft 36, the lip is deflected radially outward from the initial orientation, illustrated in FIG. 3, which the lip has prior to installation of the seal assembly 142 in the power steering system 10.

An annular coil or garter spring 158 is disposed in engagement with a radially outer side 160 of the flexible lip 148. The coil spring 158 extends around the flexible lip 148 and has a central axis 170 which is coincident with a central axis of the flexible lip 148 and the central axis of the shaft 36. The coil spring 158 is effective to press the flexible lip 148 firmly against the outer side surface 54 of the reciprocatable shaft 36 when the seal assembly 142 is installed in the steering system 10.

The improved seal assembly 142 has an annular axially inner side 164 which is exposed to hydraulic fluid pressure in the variable volume chamber 30 of the power steering motor 22. The circular radially outer side 160 of the annular flexible lip 148 is also exposed to the hydraulic fluid pressure in the variable volume chamber 30 during operation of the power steering motor 22. The improved seal assembly 142 has an annular axially outer side 166 which is exposed to ambient (air) pressure during operation of the power steering motor 22.

In accordance with a feature of this embodiment of the invention, the circular central axis 170 of the coil spring 158 is disposed in a radial plane which is offset from a radial plane containing the line 152 of minimum diameter of the flexible lip 148 in a direction toward the inner side 164 of the seal assembly 142 prior to installation of the seal assembly in the power steering system 10. The plane containing the circular central axis 170 of the coil spring 158 extends parallel to the plane containing the line 152 of minimum diameter of the flexible lip 148. The plane containing the line 152 of minimum diameter of the flexible lip 148 is offset toward the outer side 166, that is, toward the left as viewed in FIG. 3, from the radial plane containing the circular central axis 170 of the coil spring 158.

The radial plane containing the line 152 of minimum diameter of the flexible lip 148 is offset from the plane containing the circular central axis 170 of the coil spring 158 by a distance indicated at 174 in FIG. 3. The distance 174 may be referred to as the R-value of the improved seal assembly 142. Since the plane containing the circular central axis 170 of the coil spring 158 is offset toward the inner side 164 of the seal assembly from a plane containing the line 152 of minimum diameter of the flexible lip 148, the R-value of the seal assembly 142 may be referred to as being positive.

It should be understood that there is no universal convention for positive and negative R-values. However, herein, positive R-value has been assumed to mean that the plane containing the circular central axis 170 of the spring 158 is offset from the radial plane containing the circular line 152 of minimum diameter of the flexible lip 148 in a direction toward the chamber 30 and inner side 164 of the improved seal assembly 142 prior to installation of the seal assembly in the power steering system 10. Similarly, herein, negative R-value has been assumed to mean that the plane containing the circular central axis 70 (FIG. 2) of the coil spring 58 is offset in a direction toward the outer or air side 66 of the seal 42 from the radial plane containing the circular line 52 of minimum diameter of the flexible lip.

It has been determined, experimentally, that, surprisingly, seal assemblies having a positive R-value have a longer operating life than seal assemblies having a negative R-value. Thus, a seal assembly having a positive R-value, similar to the seal assembly 142 of FIG. 3, will have a longer operating life than a seal assembly having a negative R-value, similar to the seal assembly 42 of FIG. 2 in the power steering system 10 of FIG. 1. The reciprocatable shaft 36 of the power steering system 10 of FIG. 1 may have a diameter of approximately 20 millimeters to approximately 40 millimeters. For reciprocatable shafts within this range of diameters, it has been experimentally established that a seal assembly having a positive R-value, similar to the seal assembly 142 of FIG. 3, has a longer operating life than a seal assembly having a negative R-value, similar to the seal assembly 42 of FIG. 2.

In the embodiment of the invention illustrated in FIG. 3, the improved seal assembly 142 had a positive R-value of 0.50 millimeters (approximately 0.02 inches) prior to installation of the seal assembly 142 in the power steering system 10. Thus, the distance 174 by which the radial plane containing the central axis 170 of the coil spring 158 is offset from the radial plane containing the line 152 of minimum diameter of the flexible lip 148 is 0.50 millimeters in a direction toward the inner side 164 of the improved seal assembly 142. It is contemplated that the improved seal assembly 142 could be constructed with an R-value in a range which is either larger or smaller than 0.50 millimeters. It is believed that the positive R-value of the improved seal assembly 142 may vary within a range of 0.15 millimeters to 0.75 millimeters prior to installation of the seal assembly 142 in the power steering system 10. Thus, the distance 174 in FIG. 3 may vary between 0.15 millimeters and 0.75 millimeters prior to installation of the seal assembly 142 in the power steering system 10. It is believed than a positive R-value of approximately 0.50 millimeters may be preferred. Thus, it is believed that it may be preferred to have the distance 174 in FIG. 3 be approximately 0.50 millimeters.

Seal Assembly—Specific Construction

The specific construction of the improved seal assembly 142 is illustrated in FIG. 4. Although one specific construction for the improved seal assembly 142 has been illustrated in FIG. 4, it should be understood that the improved seal assembly 142 could have many different constructions if desired. However, regardless of the specific construction of the improved seal assembly 142, the seal assembly will have a positive R-value prior to installation of the seal assembly in the power steering system 10. Thus, the spring 158 will have a central axis 170 which is disposed in a radial plane which is offset from a radial plane containing the circular line 152 of minimum diameter of the flexible lip 148 in a direction toward the inner or hydraulic fluid side 164 of the seal assembly 142 prior to installation of the seal assembly in a power steering system 10.

The annular base 146 of the improved seal assembly 142 (FIG. 4) includes an annular metal reinforcing wall 182. The reinforcing wall 182 has a relatively long axially extending main section 184 and a relatively short radially extending end section 186. The main section 184 of the reinforcing wall has a cylindrical configuration. The end section 186 has an annular configuration and is integrally formed as one piece with the main section 184.

The base includes an annular molded body 190 of rubber, that is, polymeric material, which encloses the reinforcing wall 182. A very thin layer of flash is bonded to the axially outer side of the end section 186 and is disposed between the end section 186 and the motor housing 26. The annular flexible lip 148 is integrally molded as one piece with the body 190. The flexible lip 148 and the body 190 are formed of the same polymeric material.

An annular molded backup ring 194 engages the molded body 190. The backup ring 194 supports the flexible lip 148 against leftward movement under the influence of hydraulic fluid pressure in the chamber 30. The backup ring 194 is disposed in a coaxial relationship with the reinforcing wall 182 and the flexible lip 148.

The spring 158 extends around the annular flexible lip 148. The spring 158 is a tightly wound helical coil spring which is sometimes referred to as a garter spring. The annular spring 158 urges the radially inner portion of the flexible lip 148 into engagement with the cylindrical outer side surface 54 of the shaft 36.

In one specific embodiment of the preferred seal assembly 142, the seal assembly had an overall diameter of approximately 35 millimeters and an overall axial extent of approximately 6.35 millimeters. In this specific embodiment of the seal assembly 142, the line 152 of minimum diameter had a diameter of approximately 21.13 millimeters and a positive R-value of approximately 0.50 millimeters prior to installation of the seal assembly 142 in the power steering system 10.

It should be understood that the improved seal assembly 142 could have a construction other than the foregoing specific construction described herein. It should also be understood that the improved seal assembly 142 may have dimensions which are different than the specific dimensions set forth herein. The foregoing specific construction and dimensions have been set forth for purposes of clarity of description. However, it is contemplated that the improved seal assembly 142 will be constructed with a positive R-value, that is, with the plane containing the central axis 170 of the coil spring 158 offset from the plane containing the line 152 of minimum diameter of the flexible lip 148 in a direction toward the inner side 164 of the seal assembly prior to installation of the seal assembly in the power steering system 10.

Performance Comparison

Figure 5:
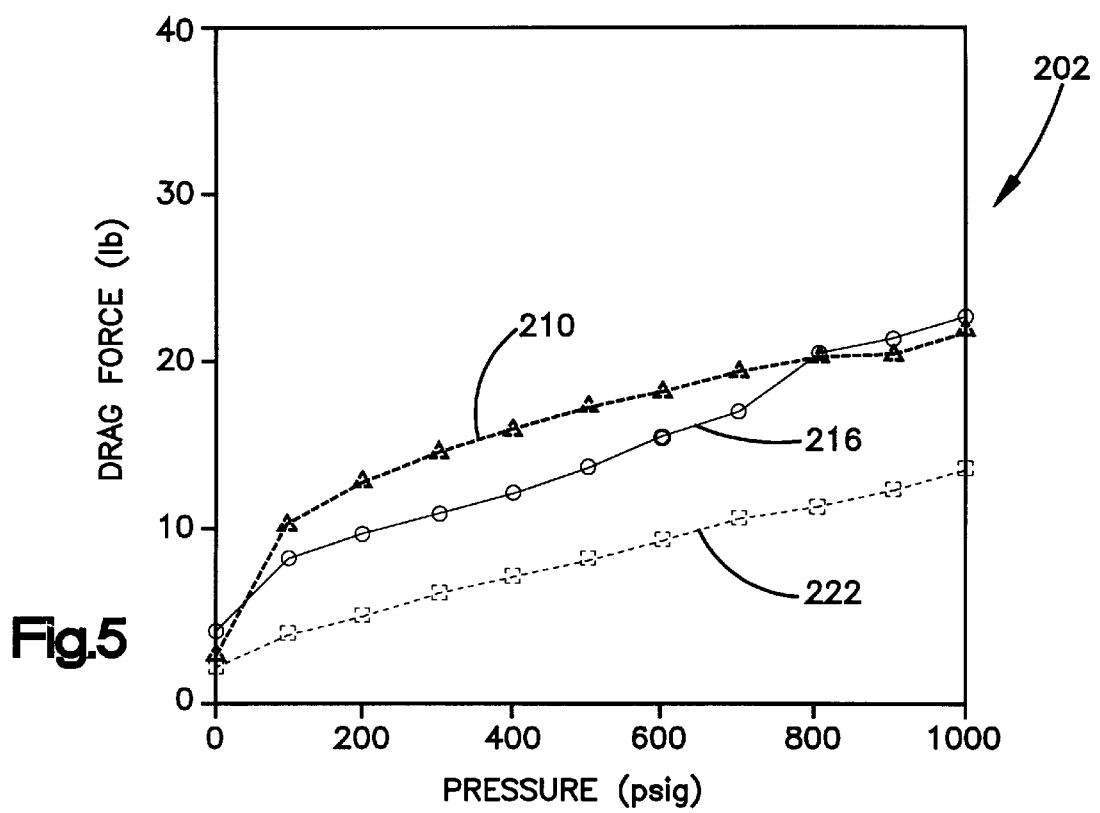
FIG. 5 is a graph depicting the relationship between drag force and oil pressure with two prior art seal assemblies and the seal assembly of the present invention.
Figure 6:
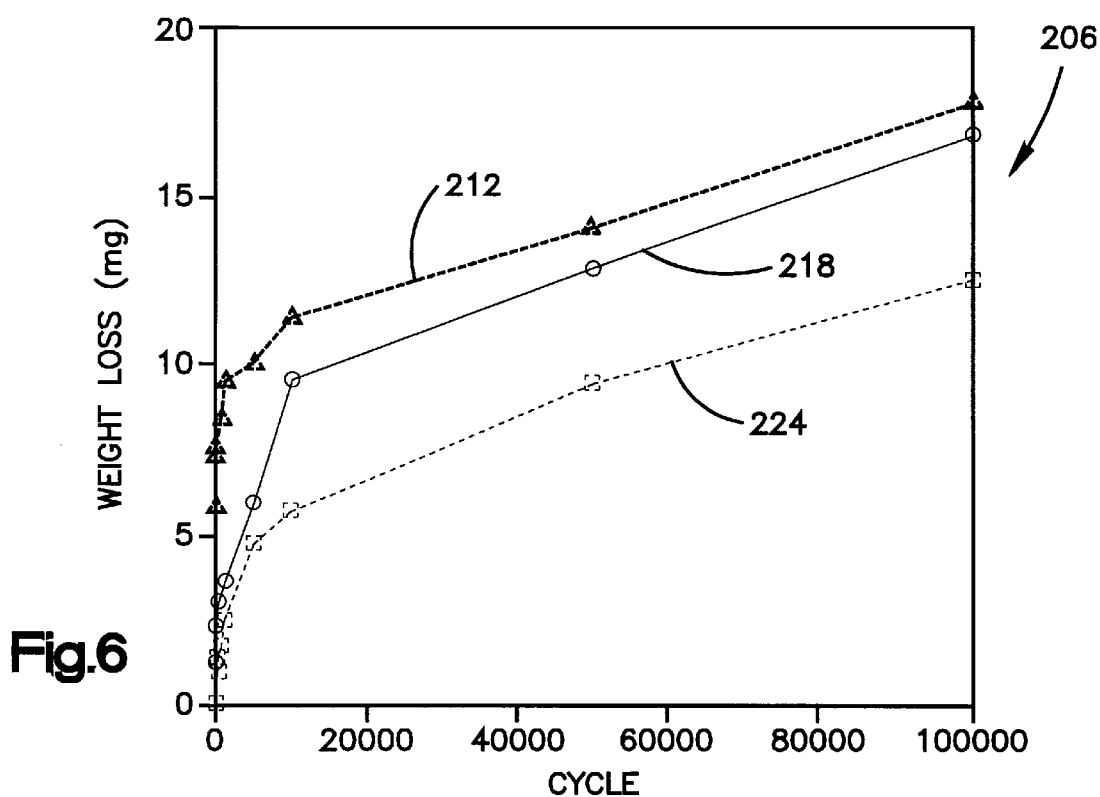
FIG. 6 is a graph illustrating wear of the two prior art seal assemblies and the seal assembly of the present invention with operating cycles of a power steering motor.

A comparison of the performance of three seal assemblies, having the same general construction as the seal assemblies 42 and 142, in association with reciprocating shafts are illustrated in FIGS. 5 and 6. A comparison of oil pressure and drag force on a reciprocating shaft by three different seal assemblies is illustrated by a graph 202 in FIG. 5. The graph 202 illustrates the manner in which the drag force applied by a seal assembly against a reciprocating shaft varies with variation in the pressure on the oil side of the seal assembly.

A second graph 206 illustrates the manner in which loss in weight of a seal assembly varies with the number of operating cycles of the seal assembly. The loss in weight of a seal assembly is a direct function of wear of the seal assembly. Of course, the greater the wear of the seal assembly, the sooner the seal assembly will leak.

The manner in which the drag force varied with hydraulic fluid pressure for a first seal assembly is illustrated by a curve 210 in a graph 202 of FIG. 5. The rate of loss of weight, that is, wear, of the first seal assembly is illustrated by a curve 212 in the graph 206 of FIG. 6. The first seal assembly corresponding to the curves 210 and 212 in FIGS. 5 and 6 had a construction corresponding to the construction of the seal assembly 42 of FIG. 2. This particular seal assembly had an R-value of negative 0.75 millimeters.

A curve 216 in the graph 202 of FIG. 5 illustrates the manner in which drag force varied with pressure for a second seal assembly. A curve 218 in the graph 206 of FIG. 6 illustrates the manner in which the second seal assembly lost weight, that is, became worn, with operating cycles. The second seal assembly had a construction corresponding to the construction of the seal assembly 42 of FIG. 2. This particular seal assembly had an R-value of negative 0.25 millimeters.

A curve 222 in the graph 202 of FIG. 5 illustrates the manner in which drag force varied with hydraulic fluid pressure for a third seal assembly. The curve 224 in the graph 206 of FIG. 6 illustrates how the third seal assembly lost weight, became worn, with operating cycles. The third seal assembly corresponding to the curves 222 and 224 in the graphs 202 and 206 had a construction corresponding to the construction of the seal assembly 142 of FIGS. 3 and 4. This particular seal assembly had an R-value of positive 0.50 millimeters.

Other than having different R-values, the seal assemblies corresponding to the curves 210, 212, 216, 218, 222 and 224 in the graphs 202 and 206 of FIGS. 5 and 6 had the same general construction. However, only the third seal assembly, that is the seal assembly corresponding to the curves 222 and 224 in FIGS. 5 and 6 had a positive R-value. The seal assemblies corresponding to the curves 210, 212, 216 and 218 had negative R-values.

During the test, the seal assembly having a positive R-value, that is, a seal assembly having the construction illustrated in FIG. 3, had the lowest total leakage. Thus, the seal assembly having the construction corresponding to the curves 222 and 224 in FIGS. 5 and 6 had a leakage of 0.125 milliliters. The seal assembly corresponding to the curves 210 and 212 and having a negative R-value of 0.75 millimeters had the most leakage, that is, a leakage of approximately 1.75 milliliters. The seal assembly corresponding to the curves 216 and 218 had the same construction as the seal assembly 42 and a negative R-value of 0.25 millimeters. The seal assembly corresponding to the curves 216 and 218 had a total leakage of 1.0 milliliters.

Analysis of the seal assemblies after the tests indicated that the seal assembly corresponding to the curves 222 and 224 in FIGS. 5 and 6, that is, the seal assembly having a positive R-value of 0.50 millimeters, had the smallest increase in diameter, that is, the least wear of the three seals. The positive R-value seal, corresponding to the curves 222 and 224 in FIGS. 5 and 6 and having the same construction as the seal assembly 142, had the highest shaft sealing force (lip load) of 11.37 ounces per circumferential length as opposed to 8.97 and 8.14 ounces per inch for the other two seal assemblies having negative R-values.

From the above description of the invention, those skilled in the art will perceive improvements, changes and modifications. Such improvements, changes and modifications within the skill of the art are intended to be covered by the appended claims.

Having described the invention, the following is claimed:

1. A seal assembly for use in a power steering system having a housing which at least partially encloses a reciprocatable shaft, said seal assembly comprising:

an inner side which is exposed to hydraulic fluid pressure during operation of the power steering system;

a base connectable with the housing;

a flexible lip extending from said base and engageable with the reciprocatable shaft, said flexible lip having a circular line of minimum diameter prior to installation of said seal assembly in the power steering system; and an annular spring disposed in engagement with a side of said flexible lip opposite from said line of minimum diameter, said spring having a circular central axis which extends around a portion of said flexible lip and which is axially offset from a plane containing said line of minimum diameter of said flexible lip in a direction toward said inner side of said seal assembly prior to installation of said seal assembly in the power steering system.

2. A seal assembly as set forth in claim 1 wherein the circular central axis of said spring is axially offset from the plane containing the line of minimum diameter of said flexible lip in a direction toward said inner side of said seal assembly by a distance of between 0.15 and 0.75 millimeters prior to installation of said seal assembly in the power steering system.

3. A seal assembly as set forth in claim 1 wherein the circular central axis of said spring is axially offset from the plane containing the line of minimum diameter of said flexible lip in a direction toward the inner side of said seal assembly by a distance of approximately 0.50 millimeters.

4. A seal assembly as set forth in claim 1 wherein the reciprocatable shaft has a diameter of between 20 millimeters and 40 millimeters.

* * * * *